D. B. RICHARDSON.
DEMOUNTABLE VEHICLE RIM.
APPLICATION FILED NOV. 7, 1913.
1,115,867.
Patented Nov. 3, 1914.
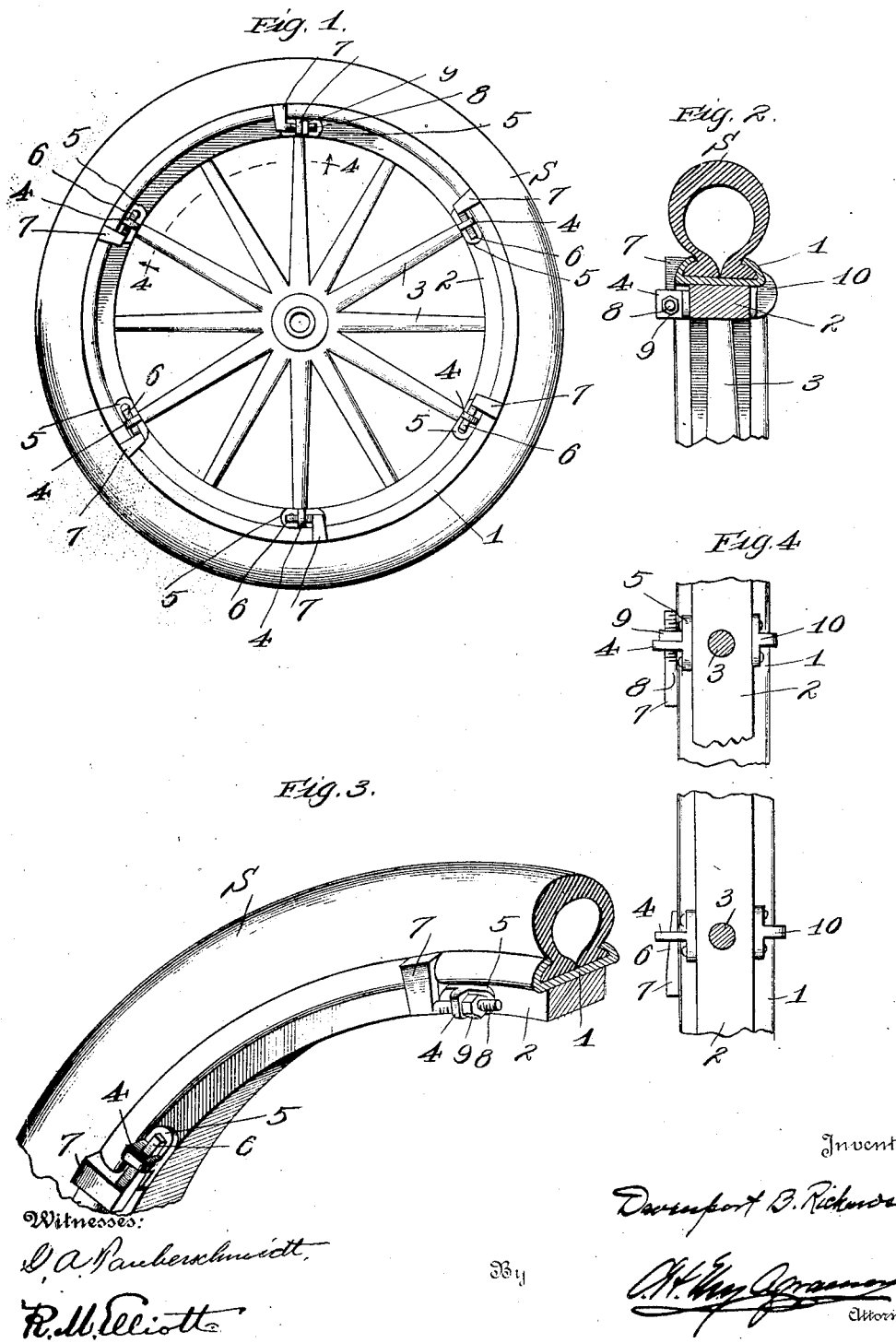

UNITED STATES PATENT OFFICE.

DAVENPORT B. RICHARDSON, OF MEXICO, MEXICO.

DEMOUNTABLE VEHICLE-RIM.

1,115,867.

Specification of Letters Patent. Patented Nov. 3, 1914.

Application filed November 7, 1913. Serial No. 799,757.

*To all whom it may concern:*

Be it known that I, DAVENPORT B. RICHARDSON, a citizen of the United States, residing at the city of Mexico, Mexico, have invented certain new and useful Improvements in Demountable Vehicle-Rims, of which the following is a specification.

This invention relates to vehicle wheels.

The object of the invention is to simplify the manner of securing demountable rims to vehicle wheels in such way as to eliminate the employment of a number of bolts and loose parts such as are required in assembling the parts of a vehicle wheel under present procedures.

With the above and other objects in view, as will appear as the nature of the invention is better understood, the same consists in the novel construction and combination of parts of a rim securing means for vehicle wheels, as will be hereinafter fully described and claimed.

In the accompanying drawing forming a part of this specification, and in which like characters of reference indicate corresponding parts, Figure 1 is a view in side elevation of an automobile wheel equipped with the improvements of the present invention. Fig. 2 is a transverse sectional view through the shoe rim and felly of the wheel. Fig. 3 is an enlarged detail perspective view of a portion of the shoe, rim and felly. Fig. 4 is a transverse sectional view taken on the line 4—4, Fig. 1, and looking in the direction of the arrow thereof.

Referring to the drawing, S designates the ordinary shoe, such as is commonly employed on automobile wheels, 1 the rim, 2 the felly and 3 the spokes.

While not herein shown, it is to be understood that an inner tube is to be employed in connection with the shoe, and as this will be readily understood, detailed illustration thereof is omitted.

The feature of the present invention which imparts novelty thereto is the fact that the rim moves in a direction parallel to that in which the wheel moves, or at right angles to the cross section of the felly, the means employed for assembling the rim with the felly causing the former to be moved laterally when assembled with the latter.

The felly and rim may be of ordinary construction, and differ therefrom only in the fact that the felly is provided with any desired number of keepers 4, each of which consists of a plate 5 firmly riveted to the felly, each keeper being provided with an orifice to receive a latch 6 carried by a lug 7 either integral with or rigidly secured to the rim, the latch being disposed at right angles to the lug. In this instance six latches are shown, and five of these are, as shown in Fig. 4, wedge-shaped, while the sixth one 8 is provided with a threaded terminal that projects through the keeper and carries a nut 9. The openings in the keepers that receive the wedge-shaped latches 6 are of such contour that when the nut 9 is tightened or seated, a lateral movement will be imparted to the rim, which will cause it to be moved into locked engagement with spaced clips 10 secured to the rim either directly opposite to or in staggered relations with the keepers 4.

In assembling the rim with the felly, the shoe and inner tube are positioned as usual, and the rim is then positioned upon the felly with the latches disposed some distance from the keepers. Upon a slight turning motion being imparted to the rim, the latches will be caused to enter the keepers, and the nut 9 is now positioned and turned to its seat, and during this operation, the wedge faces of the latches 6 will ride against the walls of the orifices in the keepers, and thus force the rim to one side and to cause it to interlock with the clips 10, thereby securely assembling the rim with the felly. When it is desired to remove the rim, it will only be necessary to deflate the tire, if the same is not already deflated, remove the single nut 9, and turn the rim a sufficient distance to clear the latches from the keepers whereby the rim and tire may readily be removed from the felly.

It will be seen from the foregoing description, that by the method of assembling the rim with the felly, it will only be necessary to employ a monkey wrench instead of the various instruments in common use, so that any person of ordinary mechanical skill can easily assemble the tire with the wheel.

What is claimed is:—

1. The combination with a felly provided on one side with clips, and on the other side with keepers each having a plate secured to the felly, and an orifice to receive a latch, and a rim carrying a plurality of wedge-shaped latches fitting said orifices, and one threaded latch, said rim being movable in a direction at right angles to the cross-section of the felly to secure the latches, and a nut on said threaded latch.

2. The combination with a felly provided on one side with clips, and on the other side with keepers formed with openings, and having plates for securing them to the felly, of a rim carrying a plurality of latches fitting said openings, one of said latches being screw-threaded to receive a nut, said rim being capable of a peripheral movement on the felly, to secure the latches, and a lateral movement to engage said clips.

3. The combination with a wheel felly provided on one side with clips and on its other side with keepers, each formed with an orifice, of a demountable rim carrying a plurality of wedge-shaped latches fitting said orifices, said rim being movable circumferentially on the periphery of the felly to seat the latches, and means for securing said latches in their seated positions.

In testimony whereof I hereunto affix my signature in presence of two witnesses.

DAVENPORT B. RICHARDSON.

Witnesses:
JOHN ALLAN HARN,
W. AREOT.